United States Patent [19]

Zyl

[11] Patent Number: 5,416,723
[45] Date of Patent: May 16, 1995

[54] LOOP POWERED PROCESS CONTROL TRANSMITTER

[75] Inventor: Ian D. Zyl, Peterborough, Canada

[73] Assignee: Milltronics Ltd., Peterborough, Canada

[21] Appl. No.: 25,786

[22] Filed: Mar. 3, 1993

[51] Int. Cl.⁶ .................. G01R 19/00; G06F 1/30
[52] U.S. Cl. .................. 364/492; 364/483; 364/707
[58] Field of Search ............ 364/492, 550, 571.01, 364/172, 483, 154, 483, 921.9, 923.1, 932.8, 707; 340/310 A; 375/36

[56] References Cited

U.S. PATENT DOCUMENTS

| | | | |
|---|---|---|---|
| 4,494,183 | 1/1985 | Bayer et al. | 364/154 |
| 4,520,488 | 5/1985 | Houvig et al. | 375/5 |
| 4,607,247 | 8/1986 | Sterling et al. | 340/310 A |
| 4,691,328 | 9/1987 | Sterling et al. | 375/36 |
| 4,729,125 | 3/1988 | Sterling et al. | 375/36 |
| 4,742,574 | 5/1988 | Smith et al. | 359/154 |
| 4,823,600 | 4/1989 | Riegel et al. | 73/592 |
| 4,831,565 | 5/1989 | Woodward | 364/571.01 |
| 4,926,340 | 5/1990 | Goetzinger et al. | 364/483 |
| 5,083,288 | 1/1992 | Somlyody et al. | 364/550 |
| 5,230,056 | 7/1993 | Hoshina | 375/750 |

FOREIGN PATENT DOCUMENTS

| | | |
|---|---|---|
| 319820A | 6/1989 | European Pat. Off. . |
| 3300222A | 5/1984 | Germany . |
| 2229897 | 10/1990 | United Kingdom . |
| WO88/01417 | 2/1988 | WIPO . |
| WO89/02578 | 3/1989 | WIPO . |

OTHER PUBLICATIONS

Patent Abstracts of Japan, vol. 16, No. 327, P.1387, Jul. 1992.

Electronics Design, vol. 32, No. 20, pp. 185-191, Oct. 1984.

Primary Examiner—Thomas G. Black
Assistant Examiner—Tan Q. Nguyen
Attorney, Agent, or Firm—Ridout & Maybee

[57] ABSTRACT

A loop-powered intelligent transmitter for process control variables is provided which can operate at an average current in excess of the minimum value of current that can flow in the loop. In order to keep the average current drawn down to the actual loop current, execution of a control program by a microprocessor incorporated in the transmitter is slowed down to the extent necessary to reduce current demand of the transmitter to that available. Slowing down is preferably accomplished by sensing when a current deficit occurs and placing the microprocessor in sleep mode to reduce current consumption until the deficit is made up. Entry into sleep mode may be deferred during time critical operations of the microprocessor.

4 Claims, 2 Drawing Sheets

LOOP POWERED PROCESS CONTROL TRANSMITTER

This invention relates to a loop-powered two wire intelligent process variable transmitter.

Process variable transmitters are widely used for sensing or measuring a process variable, and transmitting data so generated to a remote location. A common means for transmitting such data is by means of a current loop, the value of the process variable being represented by the magnitude of a current passing through the loop, the magnitude lying between predetermined minimum and maximum values, typically 4 ma and 20 ma. Such a current loop has a high degree of noise immunity and widespread industrial acceptance.

The transmitter will usually have electrical power requirements of its own, and it is often convenient to meet these power requirements from the current passing in the loop. A limitation of such loop-powered transmitters has been that they must be able to operate at the minimum level of loop current, typically 4 ma. In recent years, a number of "smart" or "intelligent" transmitters have been developed, which utilize microprocessors or microcontrollers (the word microprocessor will be used generically hereinafter) to control sensing or measurement of the process variable, and conversions of the data generated into an appropriate current level in the loop.

It is a characteristic of many microprocessors and other electronic digital components, particularly those fabrication utilizing CMOS technology, that their current consumption increases with increased rates of operation. Other operations that may be required in a transmitter may also have current demands which depend on their rate of operation. For example, where the transmitter includes a pulse-echo acoustic ranging system, each pulse or shot of acoustic energy utilized involves expenditure of a certain amount of electrical energy, and the repetition rate of the shots must be kept low enough that average current required to supply the necessary energy can be accommodated within the current available for powering the transmitter as a whole. The result of this limitation is that some intelligent transmitters are only able to perform measurements at a lower rate than would otherwise be desirable.

Examples of intelligent transmitters are to be found described in published International Applications WO 88/01417 (Rosemount Inc.) and WO 89/02578 (Square D. Company); and U.S. Pat. Nos. 4,607,247; 4,691,328; 4,729,125 (Sterling); 5,083,288 (Somlyody et al); 4,494,183 (Bayer et al); 4,520,488 (Houns et al); 4,926,340 (Goetzinger); and 4,742,574 (Smith et al.) Some of these devices appear to utilize battery or external power supplies; others adopt measures to limit average power consumption. Thus Goetzinger both utilizes a low power microprocessor, and an energy storage and management circuit to enable occasional additional power demands of the circuit to be met. Smith et al describe a circuit utilizing an operational amplifier switchable between high and low power modes. U.S. Pat. No. 4,823,600 shows a transmitter in the form of an ultrasonic sensor providing an output on a 4–20 ma loop, but the sensor is separately powered.

It is an object of the present invention to provide improved power management in a loop powered intelligent transmitter.

The invention relates to a loop powered intelligent transmitter including a microprocessor, memory storing a program for execution by the microprocessor, circuit elements for measuring a process variable under control of the microprocessor in accordance with said stored program, a current control circuit controlled by the microprocessor and determining amplitude of a current passing in a current loop between maximum and minimum finite values in a predetermined relationship to a measured value of the process variable, and a power regulating circuit providing power at a controlled potential required by said microprocessor and said measuring circuit elements. According to the invention the regulating circuit is associated with a circuit configured to sense a deficit in its capability to supply the integrated power requirements of the microprocessor and measuring circuit elements, and to delay the execution of said stored program sufficiently in response to the sensing of such a deficit to reduce said integrated power requirements to overcome the deficit. In one arrangement, a microprocessor is utilized which has, in addition to its normal operating mode, a low power consumption "sleep" mode in which program execution is halted. A power deficit results in halting of program execution, and hence of measurement processes controlled by the microprocessor, until the deficit is made up, such that the program executes intermittently, the extent of the intermittencies depending on the extent to which the normal operating power requirement exceeds the available power. In an alternative arrangement, a microprocessor is utilized of a type whose power consumption is proportional to its clock rate (e.g. most CMOS microprocessors) and which can operate satisfactorily over a wide range of clock rates, and the clock rate is reduced from a normal maximum value in response to a power deficit condition. The first arrangement is preferable where certain operation controlled by the microprocessor must be carried out in real time.

Such arrangements can enable power available from the loop to be exploited more effectively. Rather than the power consumption of the transmitter needing to be limited to that which can be provided at minimum loop current, as taught by the prior art, e.g. U.S. Pat. No. 4,607,247, it can instead have any value up to or even above that which can be provided by the maximum loop current. It is frequently the case that measurements at one end of the range of a transmitter are more critical than at the other, and by arranging that this end of the range is represented by the maximum loop current, it can be assured that the transmitter will be carrying out measurements at maximum rate at this end of the range. At the other end of the range, program execution will be slower, but the average rate of execution need be no slower than in prior art transmitters in which power requirements are always restricted to what can be provided by the minimum loop current.

SHORT DESCRIPTION OF THE DRAWINGS

FIG. 1 is a block schematic diagram of exemplary loop powered process control transmitter in accordance with the invention; and FIG. 2 is a more detailed schematic diagram of part of the transmitter.

DESCRIPTION OF THE PREFERRED EMBODIMENT

Figure 1:
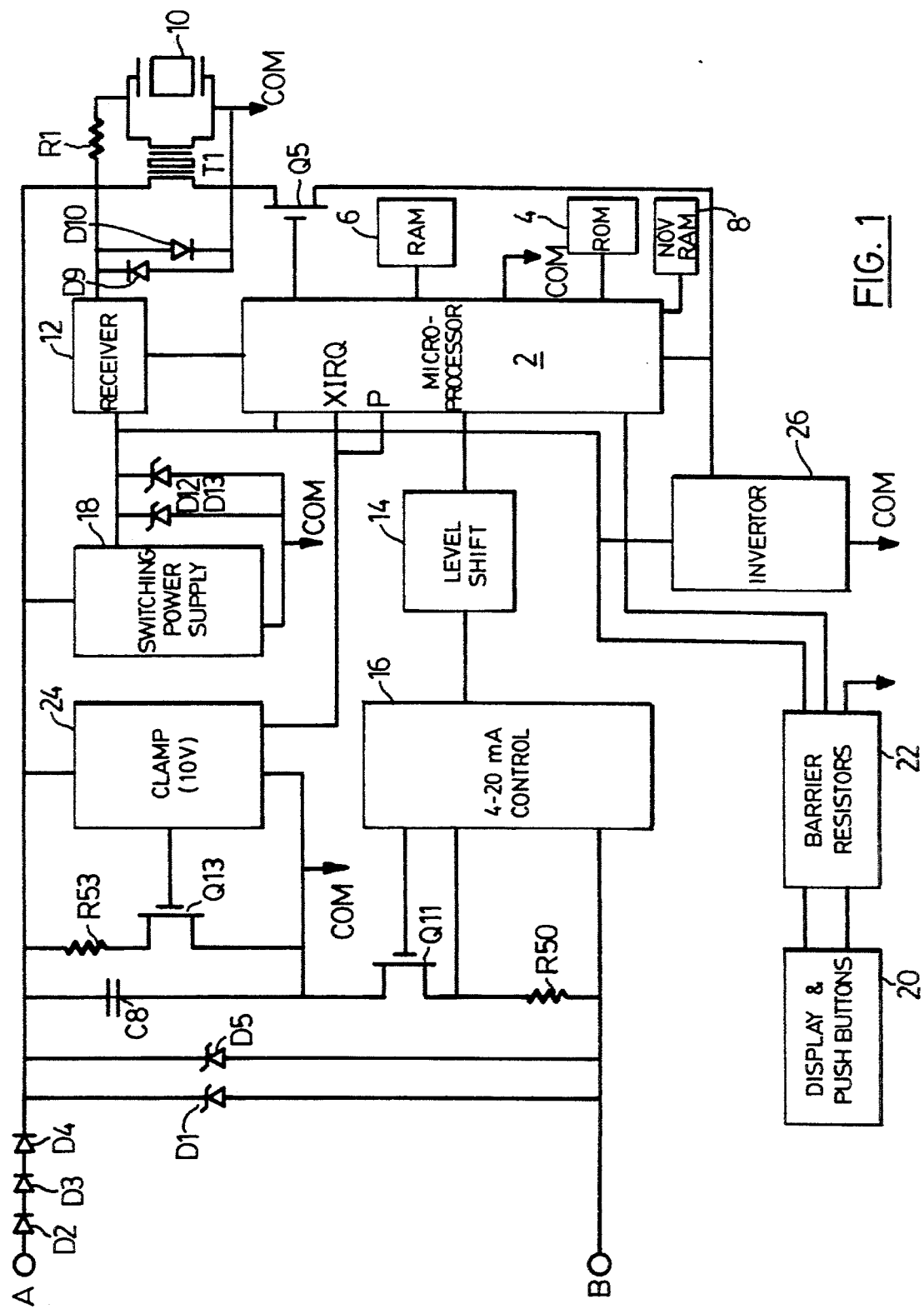

The invention is described with particular reference to a transmitter incorporating a pulse-echo acoustic ranging device, but it should be understood that it also extends to transmitters measuring other process variables, and that the details of the pulse-echo ranging techniques utilized form no part of the invention in its broadest aspect. These techniques are described in prior patents of which U.S. Pat. No. 4,831,565 and U.S. Pat. No. 5,267,219 are exemplary.

A microprocessor 2, for example a 68HC11A1 from Motorola, is associated with a read only memory 4 storing a control program for the microprocessor, random access memory 6 providing working memory and temporary storage of variables, and non-volatile memory 8 for storage of operating parameters under power-down conditions. This microprocessor is fabricated using CMOS technology, and provides a "sleep" mode in which its internal clocks stop and it ceases execution of instructions whilst preserving all of its internal registers until such a time as it receives a "wake up" signal.

The received signal is gain controlled and logarithmically amplified in the receiver before being sampled and digitized for processing by the processor 2 to identify and verify the echo and calculate the range of the target surface using known techniques which form no part of the present invention except that they are executed in accordance with the stored program and take a significant time to perform. The microprocessor also controls a display and pushbutton control panel 20 through a current limiting barrier resistor circuit 22.

Digital data representing a desired loop current in turn representing the measured range of the target surface is output from the processor to a level shifter 14 and thence to a circuit 15 which translates it into analog form and drives a transistor Q11 which regulates the current through the loop between terminal A and B, connected to a remote current sensor in series with a 24 volt power supply (not shown). It does this by sensing the potential developed across a resistor R50 which is in the loop together with transistor Q11 and a reservoir capacitor C8, and comparing it with the analog signal.

In order to avoid any possibility of excess potentials developed within the circuit being impressed upon the external portion of the current loop in an intrinsically safe application, the loop contains adjacent terminal A a series of diodes D2, D3, D4 which also protect the transmitter against inadvertent reverse connection, as well as zener diodes D1 and D5 which prevent development of an excessive potential across the transmitter.

The reservoir capacitor C8 is connected in parallel with a switching power supply 18 and the XIRQ line of the microprocessor, together with an input line P of a port provided by the microprocessor, is utilized to control its mode of operation. When the microprocessor is operating normally, the line P is monitored regularly to determine whether the microprocessor should execute an instruction putting the microprocessor into "sleep" mode. For example the port may be monitored by a real-time interrupt service routine which executes at predetermined time intervals. When this particular microprocessor is in "sleep" mode, a transition on the XIRQ line will act to wake it up and return it to normal operating mode. Successive transitions of the XIRQ line and line P can therefore be used to bring the microprocessor into and out of "sleep" mode. With other microprocessors possessing a "sleep" mode, modifications suitable to their requirements may be made to ensure appropriate mode transitions, in accordance with the published characteristics of the microprocessor utilized.

The microprocessor initiates a range measurement by outputting a series of pulses at an appropriate repetition frequency, for example 55 kHz, to a transmitter driver schematized as a single transistor Q5 in series with the primary of a step-up transformer T1 and a 10 volt supply discussed further below. The secondary of the transformer is connected to a piezoelectric transducer 10, such that the pulse train results in a high amplitude (typically 500 volts peak to peak) pulse of high frequency energy being applied to the transducer. The transducer responds by emitting a pulse of ultrasonic acoustic energy which is reflected, by a target surface whose range is to be determined, back to the transducer as an echo. The return energy picked up by the transducer is applied to a receiver 12 through a limiting circuit, including a resistor R1 and back-to-back diodes D9 and D10, which acts both to limit the amplitude of signals applied to the receiver input and to damp high amplitude oscillation of the transducer.

A clamping circuit 24 limits the potential developed across the capacitor C8 to 10 volts by turning on a transistor Q13. This places a resistor R53 in parallel with the capacitor to bleed excess charging current. The clamping circuit 24 also controls the XIRQ line of the microprocessor 2 as discussed further below with reference to FIG. 2.

The 10 volt supply from the capacitor C8 is applied to the switching power supply 18 which provides a regulated 5 volt supply to the microprocessor 2, the display 20 and the receiver 12 and the memory 4, 6 and 8, as well as to an inverter 26 which develops a −5 volt supply with reference to a common ground COM established at the lower connection to capacitor C8. The 10 volt and −5 volt supplies together provide a 15 volt supply to the primary of transformer T1 in order to power the transmitter.

During operation of the transmitter with the microprocessor operating in its normal mode, the microprocessor and its associated circuits, other than that of Q5, will draw a comparatively steady current which will depend largely on the clock rate of the microprocessor. Each time the transducer is driven to produce a pulse of acoustic energy, there will be a brief but much higher current draw. It is necessary that the combined average current draw of the circuit as a whole does not exceed the loop current representing the value of the most recent measurement, but this current may of course assume any value between 4 and 20 milliamps according to the value measured. In the particular example which has been described, and under typical conditions, the total average current draw of the transmitter when operating continuously is about 16 ma, which obviously cannot be sustained when the measurements made are represented by a loop current less than 16 ma, and will leave a surplus when the measurements made are represented by a loop current above 16 ma.

Figure 2:
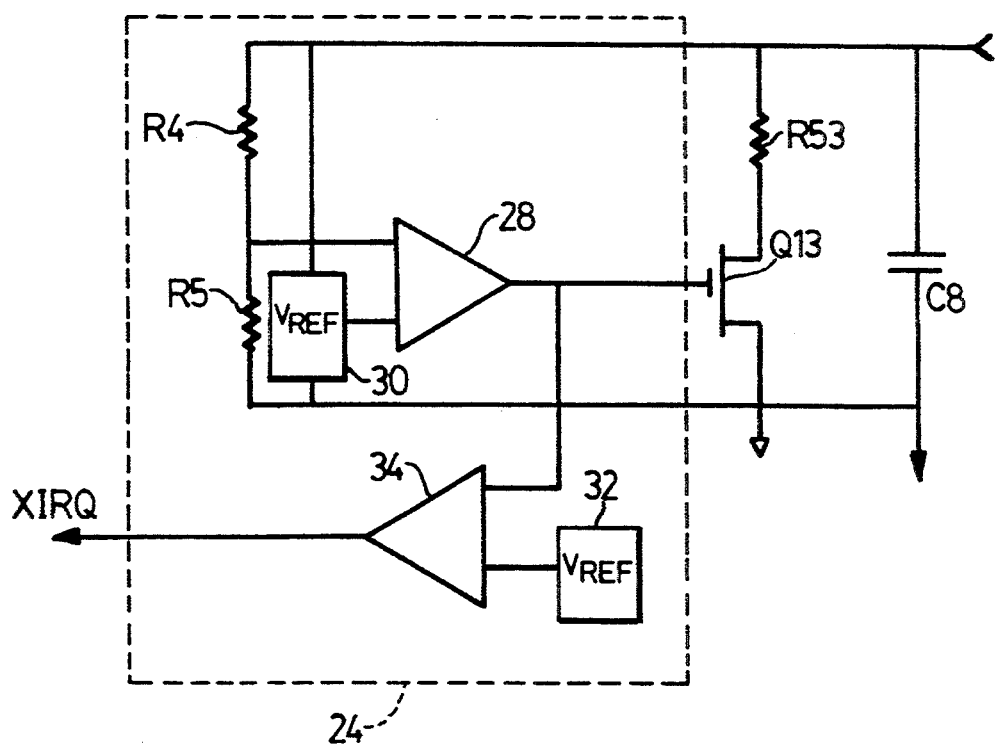

The clamp circuit 24, which is shown in more detail in FIG. 2, manages this situation. The potential across the capacitor C8 is applied to a potential divider formed by resistors R4 and R5, the potential at the junction of which is applied to one input of an amplifier 28, with a reference potential from a reference 30 being applied to the other terminal. As the potential across C8 rises above 10 volts, the transistor Q13 is turned on and bypasses excess current around the capacitor C8. When the potential drops to 10 volts the transistor Q13 is turned off, and as the potential continues to fall, the output potential from the amplifier 28 will continue to fall past a potential applied by a reference 32 to a reference input of a comparator 34, whose output which is applied to lines XIRQ and P will then change state from a logical low to a logical high. This state of line P indicates that the microprocessor should be placed in sleep mode as soon as possible. When the program, for example by means of the real-time interrupt routine previously mentioned, detects the state of line P, it may execute a stop instruction to place the microprocessor in "sleep" mode. This in turn reduces its current consumption, and that of its associated circuits, to a very low level, permitting the capacitor C8 to recharge until the logical state of the XIRQ again changes state to a logical low, thus restarting the microprocessor. If current demand still exceeds supply, then the entire process will be repeated, with the microprocessor cycling on and off with a duty ratio such as to reduce its average current consumption to that available from the loop. This slows down execution of the program—for example a single measurement may take 5 times as long when the loop current is 4 ma compared to when it is 16 ma or more.

The program should be constructed so that it does not put the microprocessor to sleep during the course of a routine which would be adversely affected by delay. For example, the microprocessor must remain fully operative during "real time" operations such as the generation of a shot or pulse of acoustic energy, and sampling, analog to digital conversion and storage of the return echo signal, although subsequent processing may safely be discontinuous. To achieve this, if the input line P is monitored by a real-time interrupt service routine, then this may conveniently be achieved by disabling this routine during critical parts of the program. Alternatively, a flag may be set during critical parts of the program which is tested to determine whether the processor may safely be put to sleep, thus enabling the sleep condition to be deferred if necessary.

Where the operation of an intelligent transmitter is such that real time operation of the controlling program is not required, and the program contains no clock-rate dependent routines, a simplified technique to control power consumption of a CMOS technology microprocessor may be employed, by using the output of the amplifier 28 to control a voltage controlled oscillator which provides a master clock for the microprocessor and slows down execution as the voltage across capacitor C8 falls below 10 volts.

The value of C8 should be high enough to avoid unnecessarily rapid cycling of the microprocessor in and out of the sleep condition, and to permit deferral of the sleep condition as discussed above without prejudicing the maintenance of adequate power to the microprocessor during execution of "real time" routines. If necessary, average power consumption during such routines may exceed maximum loop current provided that sufficient delay may be used elsewhere in the measuring cycle to reduce the overall average current to that carried by the loop. Maintenance of adequate power in the microprocessor may be assisted by feeding the transformer T1 via a further filter element comprising a low value series resistor and a high value parallel capacitor.

The means discussed for controlling the sleep mode of the microprocessor, and implementing the clamp circuit or its equivalent, are merely exemplary of techniques which could be used for this purpose, although representing the best mode currently known to the applicant.

It will be appreciated that a characteristic of the invention is that measurements at that end of a range represented by a low current may be considerably slower than measurements at the other end of the range. In many practical applications, rapid measurement at one end of the range will be much more critical than at the other, and in such instances, the transmitter should be arranged to operate so that the critical end of the range is represented by a high current, thus permitting substantially enhanced performance. In many other applications, operation will normally be in the mid part of the range, and the invention will provide significantly better performance in this area than a transmitter whose current consumption must be limited to the lowest current that can pass in the loop.

I claim:

1. In a loop powered intelligent transmitter for connection into a current loop including a microprocessor, memory storing a program for execution by the microprocessor, circuit elements for measuring a process variable under control of the microprocessor in accordance with said stored program, a current control circuit controlled by the microprocessor and determining amplitude of a current passing in the current loop between maximum and minimum finite values in a predetermined relationship to a measured value of the process variable, and a power regulating circuit drawing power from the current loop and providing power at a controlled potential to said microprocessor and said measuring circuit elements, the improvement comprising a sensing circuit configured to signal a deficit in capability of the power regulating circuit to supply combined power requirements of the microprocessor and measuring circuit elements, and means to control the microprocessor in response to signalling by said sensing circuit of such a deficit to delay further execution of said stored program sufficiently to reduce said combined power requirements.

2. The transmitter according to claim 1, wherein the microprocessor has a sleep mode, and the deficit sensing circuit is configured to place the microprocessor into sleep mode on sensing a deficit, and to wake up the microprocessor on cessation of the deficit.

3. The transmitter according to claim 2, wherein the stored program is configured to defer placing of the microprocessor in sleep mode during execution of portions of the program executing in real time.

4. The transmitter according to claim 2, including a reservoir capacitor in parallel with an input to the power regulating circuit which input receives current from the loop, wherein the deficit sensing circuit senses a potential across the capacitor, and includes a first threshold detector to determine when the potential across the capacitor exceeds a first value and means controlled by the first threshold detector to place a resistive shunt across said capacitor responsive to such a determination to cause loop current to bypass the power regulating circuit, and a second threshold detector to determine when the potential across the capacitor falls below a second value, said second threshold detector generating a signal whose transitions are utilized by said means to control the microprocessor to cause said microprocessor respectively to enter and leave said sleep mode.

* * * * *